G. ANGER.
TIRE.
APPLICATION FILED JULY 26, 1915.
1,171,298.
Patented Feb. 8, 1916.
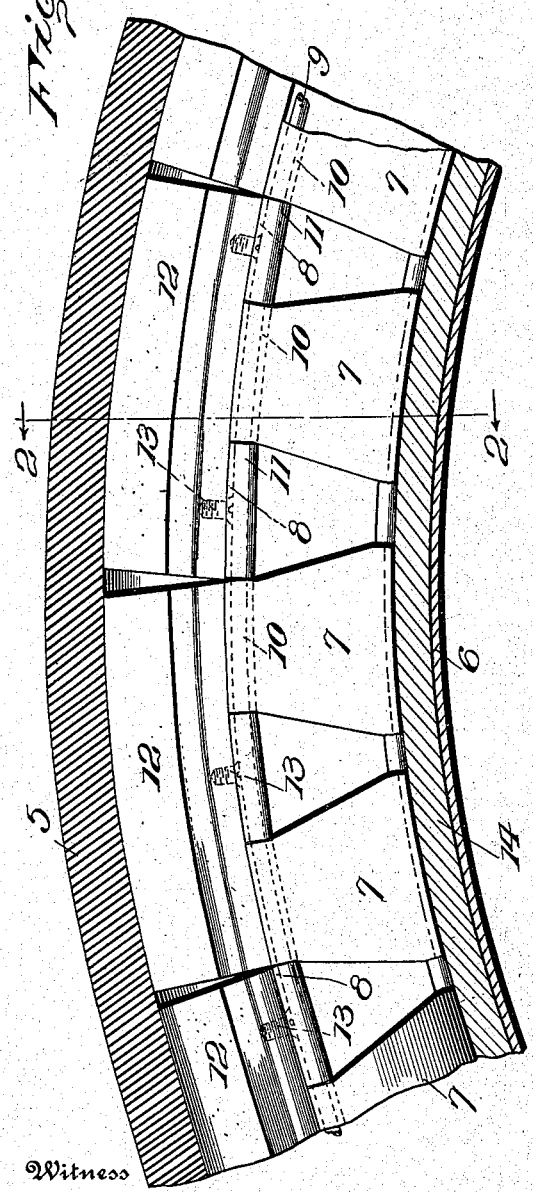
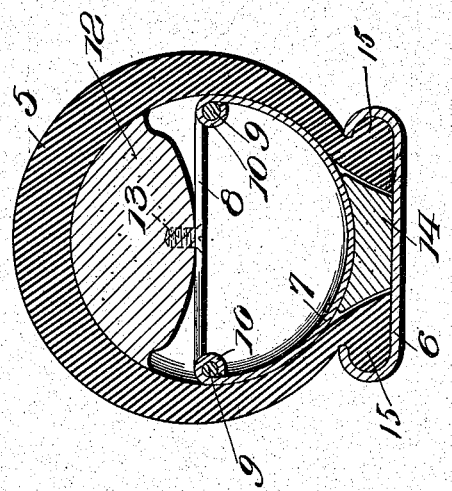
Witness
W. A. Williams
Einar Larsen
Inventor
G. Anger
By Max A. Schmidt
Attorney
THE COLUMBIA PLANOGRAPH CO., WASHINGTON, D. C.

UNITED STATES PATENT OFFICE.

GOTTLIEB ANGER, OF McKEES ROCKS, PENNSYLVANIA.

TIRE.

1,171,298.  Specification of Letters Patent.  Patented Feb. 8, 1916.

Application filed July 26, 1915. Serial No. 41,958.

*To all whom it may concern:*

Be it known that I, GOTTLIEB ANGER, a citizen of the United States, residing at McKees Rocks, in the county of Allegheny and State of Pennsylvania, have invented certain new and useful Improvements in Tires, of which the following is a specification.

This invention relates to tires in which resiliency is obtained by means of metallic springs, and the invention has for its object to provide a novel and improved arrangement of springs for this purpose, as will be described hereinafter and claimed.

In order that the invention may be better understood, reference is had to the accompanying drawing, in which—

Figure 1 is a longitudinal section of a fragment of the tire, and Fig. 2 is a cross-section on the line 2—2 of Fig. 1.

Referring specifically to the drawing, the tire consists of the usual outer casing or cover 5 of rubber or any other suitable material, and inclosing a series of metallic springs to obtain resiliency. The casing is mounted on an ordinary clencher rim 6. It will be understood, of course, that the invention is not limited to this type of rim, but may, with equal facility, be applied to any other type.

The springs are curved resilient strips or plates 7 and flat resilient strips or plates 8, placed alternately around the inside of the casing 5. The strips 7 are curved into semicircular shape and they extend transversely of the casing in spaced relation, with the strips 8 between adjacent ones of the strips 7 and extending transversely of the casing between opposite sides thereof. The strips 7 are located in the inner portion of the casing or that part which is next to the rim 6, and their free ends terminate at the sides of the casing, at or about midway between the rim and the tread. The strips 7 and 8 are held together by wire rings 9, the free ends of the strips 7 having eyes 10, and the outer ends of the transverse strips having eyes 11 to receive the rings.

In the casing 5, directly beneath the tread portion thereof, are bearing pieces or shoes 12 which are fastened to the transverse strips 8 by screws or other suitable fasteners 13. When the tire is loaded, the bearing pieces cause the strips 8 to bend inward toward the rim 6, and by their connection with the free ends of the strips 7, said ends are drawn together, whereby the desired cushioning effect is produced. The bearing pieces may be made of wood, fiber or any other suitable material. Under the curved strips 7 is located a seat 14 which extends entirely around the tire and is mounted on the rim 6 between the two flanged base portions 15 of the casing 5. The strips 7 rest on this seat, the outer surface of the same being concave to conform to the curvature of the strips. The seat is designed to prevent any tendency of the strips 7 to cut the casing 5.

A tire constructed as hereinbefore described has sufficient resiliency to take the place of a pneumatic tire, and it is also simple, cheap, and easily repaired, all the parts being readily accessible upon removing the casing 5 from the rim 6, the cushioning elements not being fastened to the casing.

I claim:

1. A tire comprising a casing, a rim on which the casing is mounted, curved transverse resilient strips and flat transverse resilient strips located in alternate order in the casing, the free ends of the curved strips being at the sides of the tire, a connection between the free ends of the curved strips and the outer ends of the flat strips, and bearing members between the flat strips and the inner surface of the casing at the tread thereof.

2. A tire comprising a casing, a rim on which the casing is mounted, curved transverse resilient strips and flat transverse resilient strips located in alternate order in the casing, the free ends of the curved strips being at the sides of the tire, a connection between the free ends of the curved strips and the outer ends of the flat strips, bearing members between the flat strips and the inner surface of the casing at the tread thereof, and a seat for the curved strips mounted on the rim between the base portions of the casing.

3. A tire comprising a casing, a rim on which the casing is mounted, curved transverse resilient strips and flat transverse resilient strips located in alternate order in the casing, the free ends of the curved strips being at the sides of the tire, and said ends and the outer ends of the flat strips having eyes, rings passing through said eyes and forming a connection between the free ends of the curved strips and the outer ends of
5 the flat strips, and bearing members between the flat strips and the inner surface of the casing at the tread thereof.

In testimony whereof I affix my signature in the presence of two witnesses.

GOTTLIEB ANGER.

Witnesses:
CHAS. F. ENGEL,
MARY C. GILLEN.

Copies of this patent may be obtained for five cents each, by addressing the "Commissioner of Patents, Washington, D. C."